(12) United States Patent
Matsuda et al.

(10) Patent No.: US 8,965,056 B2
(45) Date of Patent: Feb. 24, 2015

(54) VEHICLE SURROUNDINGS MONITORING DEVICE

(75) Inventors: Kodai Matsuda, Saitama (JP); Nobuharu Nagaoka, Saitama (JP); Makoto Aimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 95 days.

(21) Appl. No.: 13/817,466

(22) PCT Filed: Jun. 22, 2011

(86) PCT No.: PCT/JP2011/064267
§ 371 (c)(1),
(2), (4) Date: Feb. 18, 2013

(87) PCT Pub. No.: WO2012/029382
PCT Pub. Date: Mar. 8, 2012

(65) Prior Publication Data
US 2013/0243261 A1 Sep. 19, 2013

(30) Foreign Application Priority Data

Aug. 31, 2010 (JP) ................................. 2010-194971

(51) Int. Cl.
*G06K 9/00* (2006.01)
*G08G 1/16* (2006.01)

(52) U.S. Cl.
CPC ............ *G06K 9/00805* (2013.01); *G08G 1/166* (2013.01)
USPC ............................ 382/106; 382/103; 382/104

(58) Field of Classification Search
CPC .................. G06T 7/0004; G06T 2207/10028; G06T 2207/10012; G06T 7/0075; G06T 2207/10024; G06T 5/002; G06T 7/00; G06T 7/0042; G06T 7/0069; G06T 7/0083; G06T 5/008; G06T 7/0051; G06T 7/0081; G06T 7/602; G06T 11/60
USPC .......... 382/106, 104, 103, 190, 154, 107, 118
See application file for complete search history.

(56) References Cited

U.S. PATENT DOCUMENTS 7,894,633 B1 * 2/2011 Harman ......................... 382/106
7,925,050 B2 4/2011 Nagaoka et al.
(Continued)

FOREIGN PATENT DOCUMENTS

| EP | 1 918 876 A1 | 5/2008 |
|---|---|---|
| JP | 2001-028050 A | 1/2001 |

(Continued)

OTHER PUBLICATIONS

Extended European Search Report dated Feb. 20, 2014 issued in the counterpart EP patent application 11821400.6.

*Primary Examiner* — Stephen R Koziol
*Assistant Examiner* — Pinalben Patel
(74) *Attorney, Agent, or Firm* — Carrier Blackman & Associates, P.C.; Joseph P. Carrier; Jeffrey T. Gedeon

(57) ABSTRACT

When it is determined that a type of a physical body in real space corresponding to an image portion is a crossing pedestrian, a distance calculating unit 13 performs a first distance calculating process of calculating a distance between a vehicle 1 and the physical body, on the basis of a correlative relationship between the distance from the vehicle 1 set on assumption of a height of the pedestrian and a height of the image portion, according to the height of the image portion. When it is determined that the type of the physical body is not the crossing pedestrian, then the distance calculating unit 13 performs a second distance calculating process which calculates the distance between the physical body and the vehicle, on the basis of a change in size of the image portions of the physical body extracted from time-series captured images.

6 Claims, 7 Drawing Sheets

(56) References Cited

U.S. PATENT DOCUMENTS

| | | |
|---|---|---|
| 8,184,862 B2 | 5/2012 | Nagaoka |
| 8,284,253 B2 | 10/2012 | Nagaoka et al. |
| 2006/0152590 A1* | 7/2006 | Kage et al. ............... 348/208.1 |
| 2007/0127779 A1* | 6/2007 | Miyahara ................. 382/106 |
| 2007/0154068 A1* | 7/2007 | Stein et al. ............... 382/106 |
| 2009/0010495 A1* | 1/2009 | Schamp et al. ........... 382/106 |
| 2010/0077297 A1* | 3/2010 | Hori ......................... 715/243 |

FOREIGN PATENT DOCUMENTS

| | | |
|---|---|---|
| JP | 2007-015525 A | 1/2007 |
| JP | 2007-156626 A | 6/2007 |
| JP | 4267657 B2 | 5/2009 |
| JP | 2009-265882 A | 11/2009 |
| JP | 2010-092437 A | 4/2010 |
| WO | 2009/064227 A1 | 5/2009 |

* cited by examiner

VEHICLE SURROUNDINGS MONITORING DEVICE

TECHNICAL FIELD

The present invention relates to a vehicle surroundings monitoring device which monitors a surroundings of a vehicle, by captured images by a camera mounted on the vehicle.

BACKGROUND ART

Conventionally, there is known a vehicle surroundings monitoring device, which monitors a surroundings of a vehicle by a single camera mounted on the vehicle, by extracting image portions assumed as the image portion of an identical physical body, from time-series images captured by the single camera, and calculates a distance between the physical body and the vehicle from a rate of change of the size thereof (for example, refer to Patent Document 1).

PRIOR ART DOCUMENTS

Patent Documents

Patent Document 1: Japanese Patent No. 4267657

SUMMARY OF THE INVENTION

Problems to be Solved by the Invention

According to the vehicle surroundings monitoring device disclosed in Patent Document 1 mentioned above, it becomes possible to calculate the distance between the physical body and the vehicle comparatively accurately, by extracting the image portions of the identical physical body from the time-series images.

However, in the case where the physical body as the target of distance calculation is a pedestrian or a wild animal and the like crossing a road, and a posture change accompanying movement when seen from the vehicle is large, a change in shape of the image portions of the physical body between the time-series captured images become large. Therefore, there is a fear that the extraction of the image portions of the identical physical body from the time-series images becomes difficult, and the calculation accuracy of the distance between the vehicle and the physical body decreases.

The present invention has been made in view of the above-mentioned background, and aims to provide a vehicle surroundings monitoring device suppressing the decrease of the calculation accuracy of the distance between the physical body and the vehicle, on the basis of the captured images by a single camera.

Means for Solving the Problems

The present invention has been made in order to achieve the object mentioned above, and relates to a vehicle surroundings monitoring device, comprising: a distance calculating unit which calculates, on a basis of a captured image by a single camera mounted on a vehicle, a distance between a vehicle and a physical body in real space corresponding to an image portion extracted from the captured image; and a physical body type judging unit which judges a type of the physical body in real space corresponding to the image portion.

And, the distance calculating unit determines a change in shape of the image portion or a change in shape of the physical body in real space corresponding to the image portion, in a predetermined period, executes a first distance calculating process, when the change in shape exceeds a predetermined level, of calculating a distance between the physical body and the vehicle, on the basis of a correlative relationship between a distance from the vehicle in real space set on assumption of the type of the physical body and a size of the image portion in the captured image, according to the size of the image portion of the physical body extracted from the captured image, and executes a second distance calculating process, when the change in shape is equal to or less than the predetermined level, of calculating the distance between the physical body and the vehicle, on the basis of the change in size of image portions of the physical body extracted from time-series captured images by the camera (a first aspect of the invention).

According to the first aspect of the invention, the distance calculating unit determines the change in shape of the image portion or the physical body in real space corresponding to the image portion, in a predetermined period, and when the change in shape exceeds the predetermined level, performs the first distance calculating process and calculates the distance between the vehicle and the physical body. With such configuration, by using the second distance calculating process for the physical body with large change in shape, it becomes possible to suppress the decrease of the calculation accuracy of the distance between the physical body and the vehicle.

Further, the physical body is a pedestrian crossing a road, and the distance calculating unit calculates, in the first distance calculating process, of calculating the distance between the object in real space corresponding to the image portion and the vehicle, on the basis of a correlative relationship between the distance from the vehicle in real space and the height of the image portion in the captured image, set given that a height of the pedestrian is a predetermined value, according to the height of the image portion extracted from the captured image (a second aspect of the invention).

According to the second aspect of the invention, when it is determined by the physical body type judging unit that the type of the physical body in real space corresponding to the image portion extracted from the captured image is the pedestrian, the distance calculating unit may calculate the distance between the vehicle and the pedestrian crossing the road captured by the camera, on the basis of the correlative relationship between the height of the image portion in the captured image and the distance from the vehicle in real space, which is set given that the height of the pedestrian is the predetermined value.

MODE FOR CARRYING OUT THE INVENTION

Figure 1:
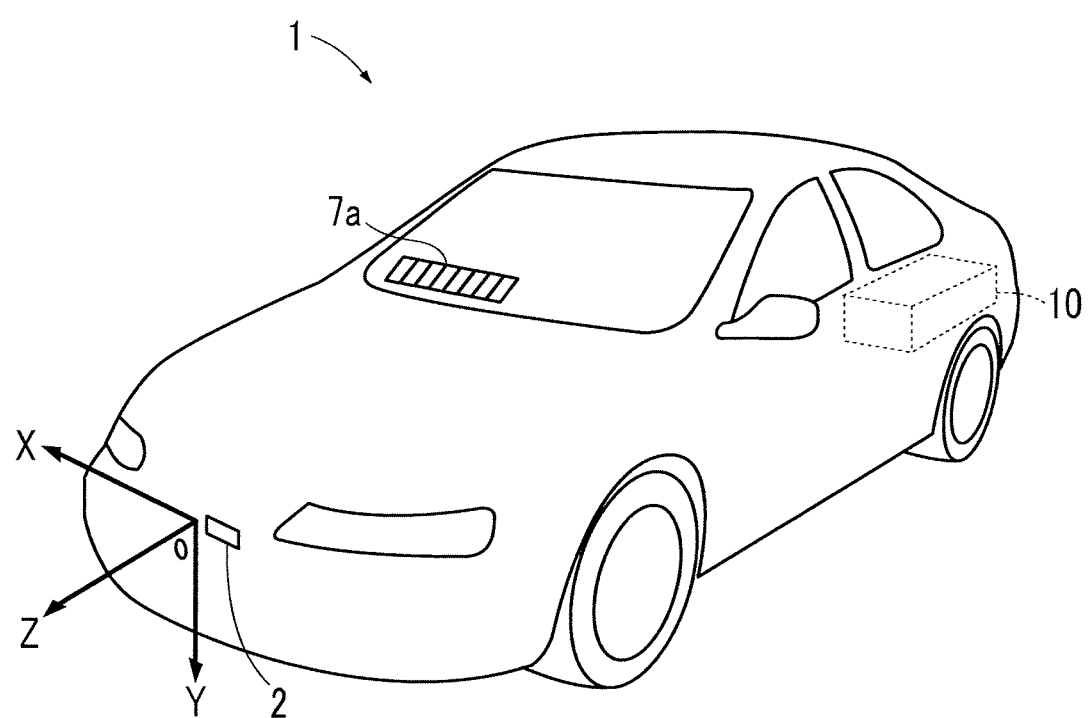
FIG. 1 is an explanatory view of a mounting manner of a vehicle surroundings monitoring device to a vehicle.

An embodiment of the present embodiment will be explained with reference to FIG. 1 through FIG. 9. With reference to FIG. 1, a vehicle surroundings monitoring device 10 of the present embodiment is used by being mounted on a vehicle 1. The vehicle 1 is equipped with an infrared camera 2 (corresponds to a camera of the present invention) capable of detecting far infrared rays.

The infrared camera 2 is fixed to a front side of the vehicle 1 to capture images in front of the vehicle 1. A real space coordinate system taking a front side of the vehicle 1 as an origin O, a lateral direction of the vehicle 1 as an X axis, a vertical direction thereof as a Y axis, and an anteroposterior direction thereof as a Z axis is defined. Alternatively, a camera having sensitivity in other wavelength band such as visible light may be used in place of the infrared camera 2.

Figure 2:
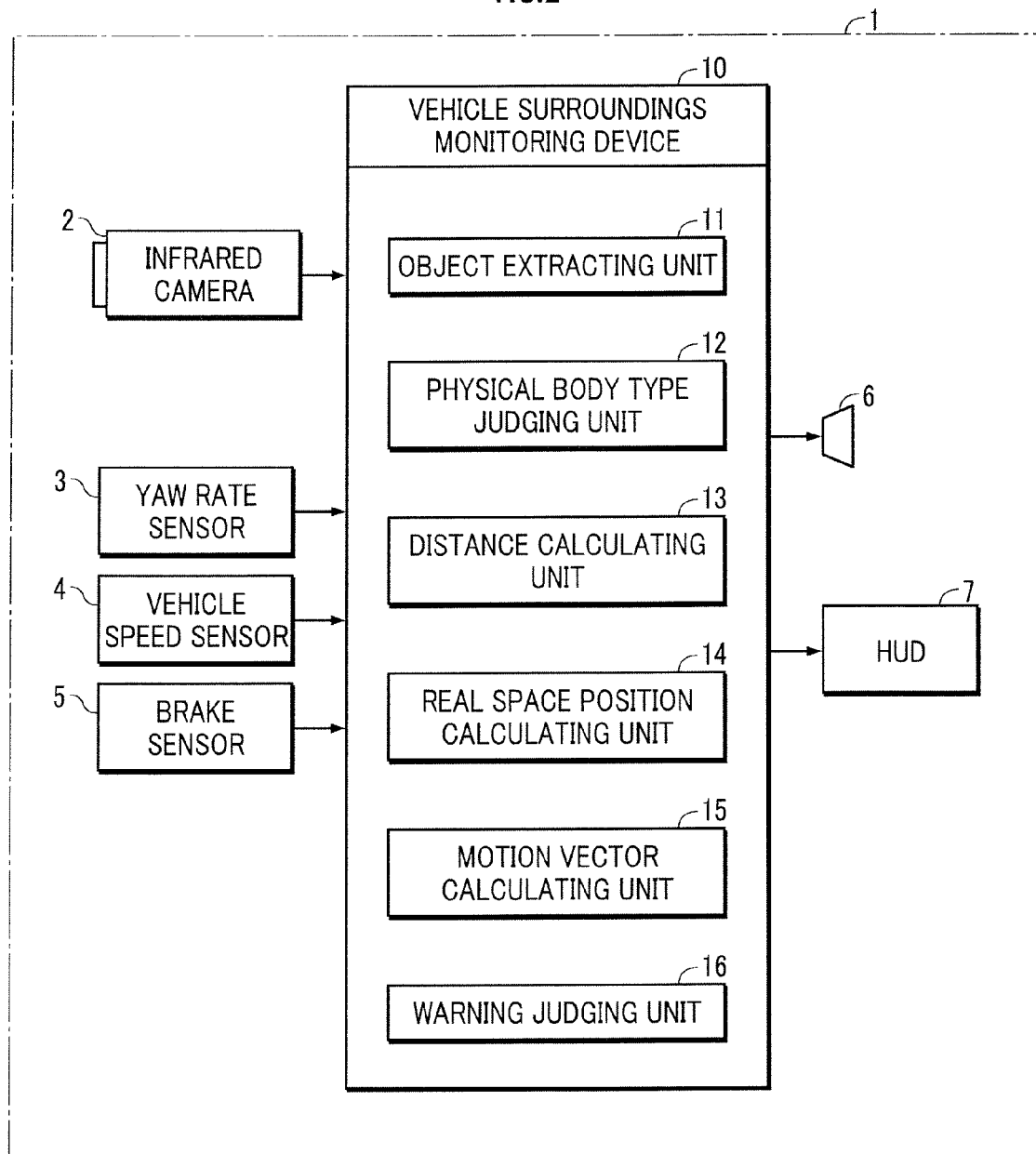
FIG. 2 is a configuration view of the vehicle surroundings monitoring device.

Next, with reference to FIG. 2, the vehicle 1 is connected with a yaw rate sensor 3 for detecting a yaw rate of the vehicle 1, a vehicle speed sensor 4 which detects a traveling speed of the vehicle 1, a brake sensor 5 which detects a manipulation amount of a brake by a driver, a loudspeaker 6 for performing attention-seeking by voice and the like, and a head up display 7 (hereinafter referred to as HUD 7) for displaying an image captured by the infrared camera 2 and performing display to make the driver visualize a physical body having high possibility of coming into contact with the vehicle 1. As is shown in FIG. 1, the HUD 7 is provided so as to display a screen 7a on a windshield of the vehicle 1 at a forefront position on the driver's side.

The vehicle surroundings monitoring device 10 is an electronic unit configured from a CPU, a memory (not shown) and the like, and has a function of converting a video signal output from the infrared camera 2 into a digital data and taking in the same into an image memory (not shown), and to perform various arithmetic processing to the captured image in front of the vehicle 1 taken into the image memory with the CPU.

Thereafter, by making the CPU execute a control program of the vehicle surroundings monitoring device 10, the CPU functions as an object extracting unit 11 which extracts an image portion having a predetermined condition from the image captured by the infrared camera 2, a physical body type judging unit 12 which judges a type of the physical body in real space corresponding to the extracted image portion, a distance calculating unit 13 which calculates a distance between the physical object and the vehicle 1, a real space position calculating unit 14 which calculates a real space position of the physical body, a motion vector calculating unit 15 which calculates a motion vector of the physical body in the real space, and a warning judging unit 16 which determines whether or not to make the physical body a target of warning on the basis of the motion vector.

Next, according to a flow chart shown in FIG. 3, a series of a vehicle surroundings monitoring process by the vehicle surroundings monitoring device 10 will be explained. The vehicle surroundings monitoring device 10 executes a process by the flow chart shown in FIG. 3 every predetermined control cycle, and monitors the surroundings of the vehicle 1.

In STEP 1, the vehicle surroundings monitoring device 10 inputs the video signal output from the infrared camera 2, and takes in to the image memory a gray scale image obtained by converting the video image to a digital gradation (luminance) data.

Subsequent STEP 2 is a process by the object extracting unit 11. The object extracting unit 11 obtains a binary image by performing, for each pixel in the gray scale image, a binarization process of setting "1" (white) for a pixel with the luminance of a predetermined threshold value or more, and "0" (black) for a pixel with the luminance smaller than the threshold value. Thereafter, the object extracting unit 11 calculates a run length data of each white region in the binary image, performs a labeling process and the like, and extracts the image portion of the physical body.

Subsequent STEP 3 is a process by the physical body type judging unit 12. The physical body type judging unit 12 determines whether or not the physical body extracted in STEP 2 (hereinafter referred to as an object) is a pedestrian crossing a road (hereinafter referred to as a crossing pedestrian), on the basis of an amount of characteristics of the image portion.

Figure 4:
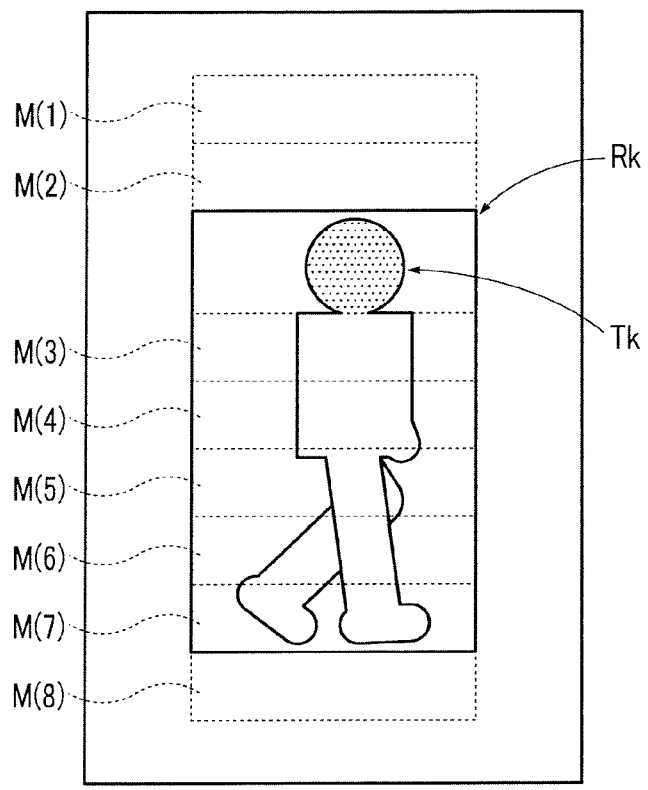
FIG. 4 is an explanatory view of a pedestrian determination.

FIG. 4 illustrates the image of the crossing pedestrian, and the physical body type judging unit 12 searches upper regions M(1), M(2) of an image portion Tk estimated as a head of the crossing pedestrian and lower regions M(3) through M(8), and recognizes the characteristics of each region. Thereafter, the physical body type judging unit 12 judges the type of the object as the crossing pedestrian, when the upper regions M(1), M(2) of the image portion Tk does not have characteristic portion, and a reversed V shape (two slant edges crossing at top) at a bottom end, which is a specific characteristics of the crossing pedestrian, is recognized in the lower regions M(3) through M(8). Further, the physical body type judging unit 12 sets an object region Rk including the image portion Tk estimated as the head through the lower end M(7).

The judging of the crossing pedestrian may be performed by a complexity or change in luminance dispersion, or a periodicity and the like of the image.

Subsequent STEP 4 through STEP 5 and STEP 20 are process by the distance calculating unit 13. The distance calculating unit 13 determines whether or not the type of the object is judged as the crossing pedestrian in STEP 4, and when it is determined as the crossing pedestrian (in this case, it is assumed that a change in shape of the object and the image portion is large, and exceeds a predetermined level), branches to STEP 20 and executes a first distance calculating process. On the other hand, when it is judged that the type of the object is not the crossing pedestrian (in this case, it is assumed that the change in shape of the object and the image portion is small, and becomes the predetermined level or less), the process proceeds to STEP 5, the distance calculating unit 13 proceeds to STEP 5 and executes a second distance calculating process.

The second distance calculating process is, as is explained later, for calculating the distance between the object and the vehicle 1, on the basis of a rate of change of a size of the image portions of an identical object that are extracted from time-series images captured by the infrared camera 2.

Figure 5:
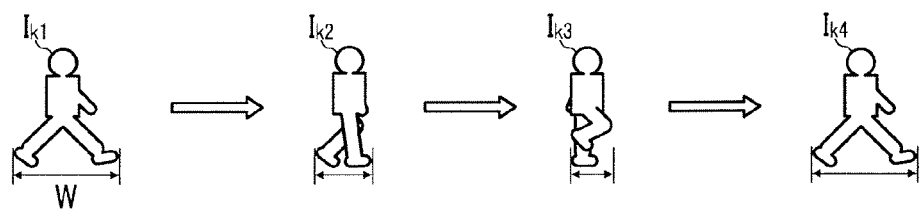
FIG. 5 is an explanatory view of a motion of the pedestrian crossing a road.

As is shown in FIG. 5, the crossing pedestrian crosses the front of the vehicle 1, while moving both legs and arms widely, as is shown in Ik1 through Ik4 in FIG. 5. Therefore, the shape of the image portion of the crossing pedestrian (width W and the like) in the captured image by the infrared camera 2 changes greatly. As such, there are cases where it is not possible to extract the image portions of the crossing pedestrian as the image portions of identical physical body, between the time-series images captured by the infrared camera 2, and even if it is possible to extract the same, it is difficult to obtain the rate of change of size with good accuracy.

Therefore, when it is judged that the type of the object is the crossing pedestrian, the distance calculating unit 13 calculates in STEP 20 the distance between the object and the vehicle 1, on the basis of a height of the image portion of the object in a single captured image.

Figure 6:
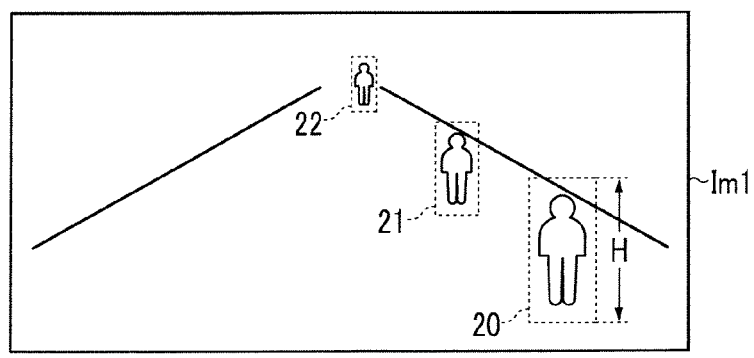
FIG. 6 is an explanatory view of a correlative relationship between a distance and a height of an image portion of the pedestrian.

As is shown in FIG. 6, in the case where a height of a pedestrian is set constant (for example, 170 cm), a height H of the image portion of the pedestrian in a captured image Im1 by the infrared camera 2 becomes lower, as the distance between the pedestrian and the vehicle 1 becomes longer. Therefore, the distance calculating unit 13 calculates the distance between the object and the vehicle 1 in real space, taking the height of the pedestrian in real space constant, and applying the height of the image portion of the object in the captured image, to a map setting a correlative relationship between a distance L between the pedestrian and the vehicle 1 in real space and a height H of the image portion of the pedestrian in the captured image or to a correlation equation.

Figure 7:
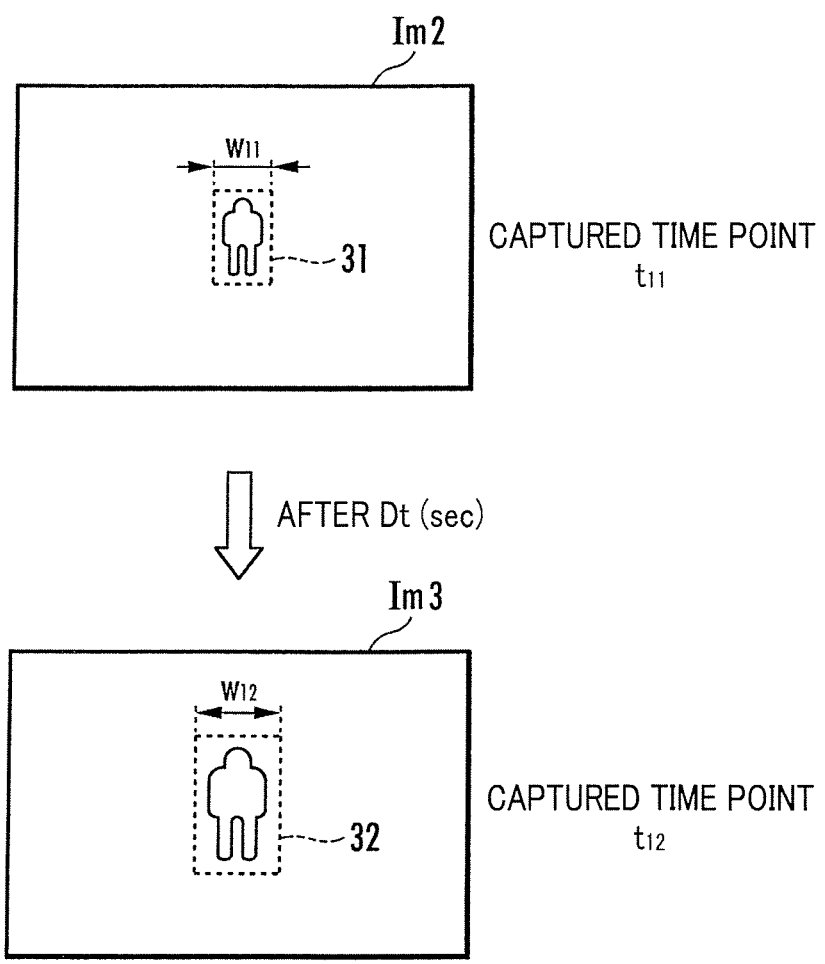
FIG. 7 is an explanatory view of a change in size of the image portion of an object in time-series images.

Further, when it is judged that the type of the object is not the crossing pedestrian, the distance calculating unit 13 calculates in STEP 5 the distance between the object and the vehicle 1 by executing the second distance calculating process. As is shown in FIG. 7, in the second distance calculating process, a process of tracking the image portions of the identical object, between an image Im2 captured at previous control cycle (capturing time point $t_{11}$) and an image Im3 captured at current control cycle (capturing time point $t_{12}$). The tracking process is explained in detail for example in Japanese Patent Laid-Open No. 2007-213561, so that explanation thereof is omitted in this specification.

Then, the distance calculating unit 13 calculates a rate of change Rate by dividing a width $w_{11}$ of an image portion 31 in the image Im2 by a width $w_{12}$ of an image portion 32 in the image Im3, according to the following expression (1). A relative speed Vs between the vehicle 1 and the object is approximated by the traveling speed of the vehicle detected by the vehicle speed sensor 4.

[Expression 1]

$$\begin{aligned} Rate &= \frac{w_{11}(previous)}{w_{12}(current)} = \frac{f \cdot W / Z_1}{f \cdot W / Z_2} \\ &= \frac{Z_2}{Z_1} = \frac{Z_2}{Z_2 + V_s \cdot dT} \\ &= \frac{V_s \cdot T}{V_s \cdot T + V_s \cdot dT} \\ &= \frac{1}{1 + dT/T} \end{aligned} \qquad (1)$$

Where $w_{11}$: width of image portion of object at previous image capturing (capturing time point $t_{11}$), $w_{12}$: width of image portion of object at current image capturing (capturing time point $t_{12}$), f:f=F (focal length of infrared camera 2)/p (pixel pitch of captured image), W: width of object in real space, $Z_1$: distance from vehicle 1 to object at previous image capturing (capturing time point $t_{11}$), $Z_2$: distance from vehicle 1 to object at current image capturing (capturing time point $t_{12}$), Vs: relative speed between vehicle and object, dT: image capturing interval, T: arrival time of self vehicle (estimated time until object reaches vehicle 1).

Subsequently, the distance calculating unit 13 calculates a distance $Z_2$ between the vehicle 1 and the object at current image capturing, with an expression (2) below transformed by substituting the relative velocity Vs between the vehicle 1 and the object (=the traveling speed Vj of the vehicle 1+a traveling speed Vd of the object) in the above-mentioned expression (1) with the traveling speed Vj of the vehicle, assuming that the traveling speed Vj of the vehicle 1 is sufficiently higher than the traveling speed Vd of the object.

[Expression 2]

$$Z_2 = \frac{Rate \cdot Vj \cdot dT}{1 - Rate} \qquad (2)$$

Where $Z_2$: distance from vehicle 1 to object at current image capturing, Rate: rate of change, Vj: traveling speed of vehicle 1, dT: image capturing interval.

Subsequent STEP 6 is a process by the real space position calculating unit 14. The real space position calculating unit 14 calculates a distance $Z_1$ from the vehicle 1 to the object in previous image capturing by a following expression (3).

[Expression 3]

$$Z_1 = Z_2 + Vj \cdot dT \qquad (3)$$

Where $Z_1$: distance from vehicle 1 to object at previous image capturing, $Z_2$: distance from vehicle 1 to object at current image capturing, Vj: traveling speed of vehicle 1, dT: image capturing interval.

Then, the real space position calculating unit 14 calculates the real space positions of the object in the current and the previous image capturing, from the position of the image portion of the object in the current and the previous binary images.

FIG. 8(a) shows a position Pi_2 ($x_{12}$, $y_{12}$) of the current image portion of the object, and a position Pi_1 ($x_{11}$, $y_{11}$) of the previous image portion of the object in the binary image Im4, wherein an axis of ordinate y is set to a vertical direction of the image, and an axis of abscissas x is set to a horizontal direction of the image.

Further, FIG. 8(b) shows a moving state of the object in real space, wherein Z axis is set to a traveling direction of the vehicle 1, and X axis is set to a direction orthogonal to the Z axis. In the figure, Pr_2 ($X_{12}$, $Y_{12}$, $Z_{12}$) shows a position of the object at the current image capturing, and Pr_1 ($X_{11}$, $Y_{11}$, $Z_{11}$) shows a position of the object at the previous image capturing. Further, Vm is the motion vector of the object in real space estimated from Pr_2 and Pr_1.

The real space position calculating unit 14 calculates a real space coordinate Pr_2 ($X_{12}$, $Y_{12}$, $Z_{1t}$) of the object at current image capturing from following expression (4), and calculates a real space coordinate Pr_1 ($X_{11}$, $Y_{11}$, $Z_{11}$) of the object at previous image capturing from following expression (5). Here, $Z_{11}=Z_1$, and $Z_{12}=Z_2$.

[Expression 4]

$$\begin{cases} X_{12} = \dfrac{x_{12} \cdot Z_2}{f} \\ Y_{12} = \dfrac{x_{12} \cdot Z_2}{f} \end{cases} \qquad (4)$$

Where $X_{12}$, $Y_{12}$: real space coordinate values of object at current image capturing, $x_{12}$, $y_{12}$: coordinate values of image portion of object at current binary image, $Z_2$: distance from vehicle to object at current image capturing, f: f=F (focal length of infrared camera)/p (pixel pitch of captured image).

[Expression 5]

$$\begin{cases} X_{11} = \dfrac{x_{11} \cdot Z_1}{f} \\ Y_{11} = \dfrac{x_{11} \cdot Z_1}{f} \end{cases} \quad (5)$$

Where $X_{11}$, $Y_{11}$: real space coordinate values of object at previous image capturing, $x_{11}$, $y_{11}$: coordinate values of image portion of object at previous binary image, $Z_1$: distance from vehicle to object at previous image capturing, f: f=F (focal length of infrared camera)/p (pixel pitch of captured image).

Further, the real space position calculating unit 14 performs a turning angle correction of correcting a position deviation on the image from the turning of the vehicle 1, on the basis of a turning angle recognized from a detected signal YR of the yaw rate sensor 3. Specifically, when the turning angle of the vehicle 1 from the previous image capturing to the current image capturing is θr, then the real space coordinate values are corrected with following expression (6).

[Expression 6]

$$\begin{bmatrix} Xr \\ Yr \\ Zr \end{bmatrix} = \begin{bmatrix} \cos\theta r & 0 & -\sin\theta r \\ 0 & 1 & 0 \\ \sin\theta r & 0 & \cos\theta r \end{bmatrix} \begin{bmatrix} Xo \\ Yo \\ Zo \end{bmatrix} \quad (6)$$

Where Xr, Yr, Zr: real space coordinate values after turning angle correction, θr: turning angle, Xo, Yo, Zo: real space coordinate values before turning angle correction.

Figure 8:
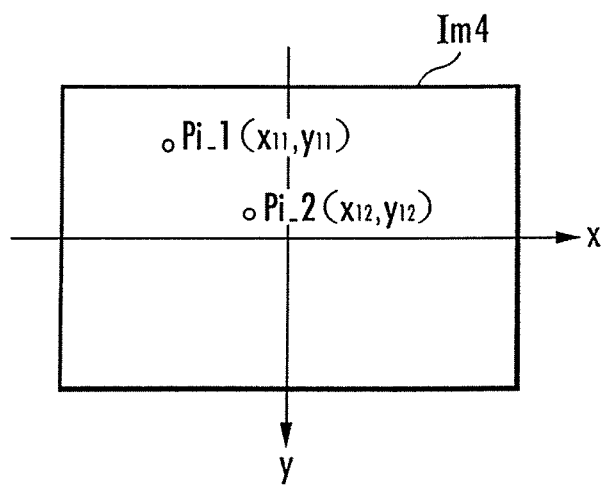
FIG. 8 is an explanatory view of an estimating process of a motion vector of the object in real space.
Figure 8:
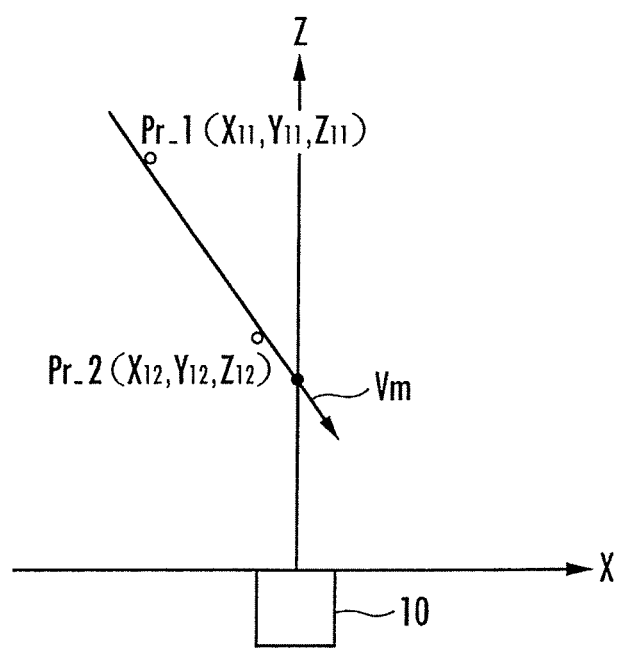

Subsequent STEP 7 is a process by the motion vector calculating unit 15. As is shown in FIG. 8(*b*), the motion vector calculating unit 15 obtains an approximation straight line Vm corresponding to a relative motion vector between the object and the self vehicle 1, from the real space position Pr_1 of the previous image capturing and the real space position Pr_2 of the current image capturing for the identical object.

The relative motion vector may be obtained using the real space positions of the object at plural time points in the past. Further, a specific calculation process of the approximation straight line is, for example a method disclosed in Japanese Patent Laid-Open No. 2001-6096.

Subsequent STEP 9 and STEP 30 through STEP31 are process by the warning judging unit 16. In STEP 9, when the object exists within an approximate judging region in front of the vehicle, or when the motion vector of the object is oriented within the approximate judging region, the warning judging unit 16 sets the object as a target of warning.

Thereafter, if the object is set as the warning target, the warning judging unit 16 further determines whether or not a braking operation is performed by the driver from the output from the brake sensor 5. When the braking operation is performed, and when an acceleration of the vehicle 1 (in this case, a decelerating direction is positive) is larger than a predetermined acceleration threshold value (it is assumed that appropriate braking operation is performed by the driver), the warning judging unit 16 determines that no warning output is necessary because an avoiding operation is being performed, and proceeds to STEP 10.

On the other hand, when no braking operation is performed or when the acceleration of the vehicle is equal to or less than the acceleration threshold value, the process branches to STEP 30. And, the warning judging unit 16 outputs alarming sound from the loudspeaker 6 in STEP 30, and also displays a highlighted image of the object to the HUD 7 in STEP 31, and proceeds to STEP 10.

Figure 9:
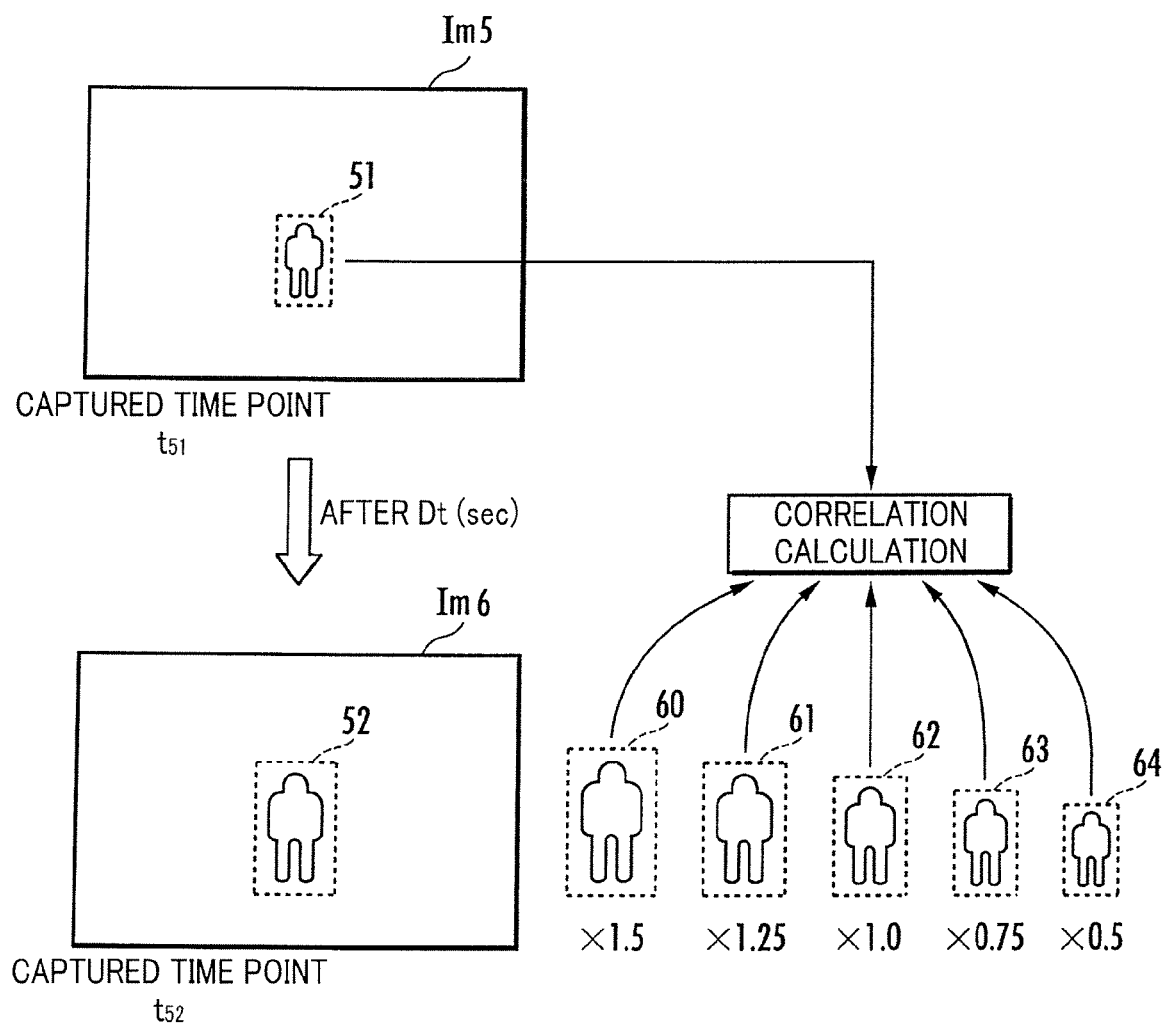
FIG. 9 is an explanatory view of a calculating process of a rate of change of the image portion of a physical body by pattern matching.

In the present embodiment, the distance calculating unit 13 calculated, in the second distance calculating process, the rate of change Rate by a time tracking operation of the image portion of the identical object between the binary images shown in FIG. 7. However, the rate of change Rate may be calculated by a correlation calculation of the image portion of the object shown in FIG. 9. With reference to FIG. 9, Im5 is a grayscale image at the previous image capturing, and 51 shows the image portion of the object. Further, Im6 is a grayscale image at the current image capturing, and 52 shows the image portion of the object.

The distance calculating unit 13 reduces (in the case where the object is approaching the self vehicle) or expands (in the case where the object is departing from the self vehicle) the size of the image portion 52 of the object in the current grayscale image Im6 by affine transformation, and calculates a degree of correlation with the image portion 51 of the object at the previous image capturing. Specifically, as is shown in the figure, the degree of correlation between the image portion 51, and an image 60 obtained by expanding image portion 50 by 150%, an image 61 obtained by expanding by 125%, an image 62 obtained by expanding by 100%, an image 63 obtained by expanding by 75%, and an image 64 obtained by expanding by 50%. Thereafter, distance calculating unit 13 determines the magnification of the image portion 52 which has the highest degree of correlation as the rate of change Rate.

Further, in the present embodiment, a configuration for capturing the front of the vehicle is shown. However, other directions, such as a rear or a side of the vehicle, may be captured, to determine the contact possibility with a monitored object.

Further, in the present embodiment, a case where the specified target shape of the present invention is the crossing pedestrian is shown. However, the present invention is applicable to other type of physical bodies, such as a large-sized wild animal crossing the road, which is assumed that a shape of an image portion between time-series captured images change to a degree that makes it difficult to extract as the image portion of the identical physical body, by previously assuming the size of the object type (height, width and the like), and to set the correlative relationship between the distance from the vehicle 1 and the image portion of the physical body in the captured image.

Further, in the present embodiment, the first distance calculating process and the second distance calculating process are switched after the determination of the crossing pedestrian. However, a determination on whether or not it is a physical body with small change of shape between the time-series images (vehicle, or a predetermined stationary object, and the like) may be performed, and the distance between the vehicle 1 and the physical body may be calculated using the second distance calculating process when it is determined that the physical body is a physical body having small change of shape, and the distance may be calculated using the first distance calculating process when it is not determined that the physical body is a physical body having small change of shape.

Figure 3:
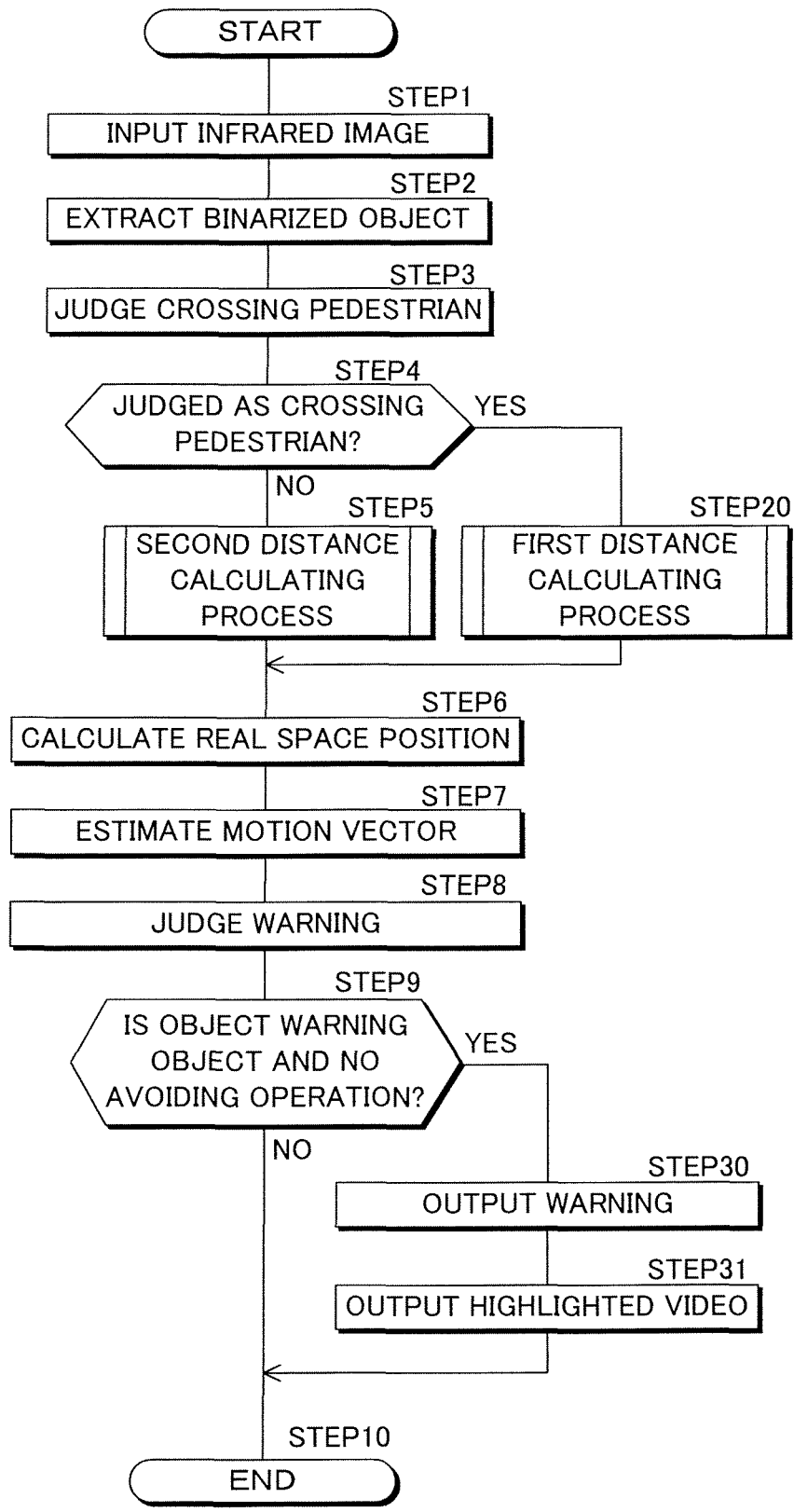
FIG. 3 is an operational flow chart of the vehicle surroundings monitoring device.

In this case, the determination on whether or not the physical body is a physical body having small change of shape is performed in place of the determination of crossing pedestrian in STEP 4 of FIG. 3, and takes a configuration in which the process proceeds to STEP 5 when it is a physical body with small change of rate and calculates the distance between the vehicle 1 and the physical body by the second distance calculating process, and branches to STEP 20 when it is not the physical body with small change in shape and calculates the distance between the vehicle 1 and the physical object by the first distance calculating process.

INDUSTRIAL APPLICABILITY

As is explained above, according to the vehicle surroundings monitoring device of the present invention, it becomes possible to suppress the decrease in the calculation accuracy between the physical body and the vehicle, on the basis of the captured image by a single camera, therefore it is useful in monitoring by calculating the distance between the physical bodies in the surroundings of the vehicle and the vehicle.

DESCRIPTION OF REFERENCE NUMERALS

1 . . . vehicle, 2 . . . infrared camera (image capturing means), 3 . . . yaw rate sensor, 4 . . . vehicle speed sensor, 5 . . . brake sensor, 6 . . . loudspeaker, 7 . . . HUD, 10 . . . vehicle surroundings monitoring device, 11 . . . object extracting unit, 12 . . . physical body type determining unit, 13 . . . distance calculating unit, 14 . . . real space position calculating unit, 15 . . . motion vector calculating unit, 16 . . . warning judging unit.

The invention claimed is:

1. A vehicle surroundings monitoring device, comprising:
a distance calculating unit which calculates, on a basis of a captured image by a single camera mounted on a vehicle, a distance between the vehicle and a physical body in real space corresponding to an image portion extracted from the captured image; and
a physical body type judging unit which judges a type of the physical body in real space corresponding to the image portion;
wherein the distance calculating unit
determines a change in shape of the image portion or a change in shape of the physical body in real space corresponding to the image portion, in a predetermined period,
determines whether to execute a first distance calculating process or a second distance calculating process based on whether the change in shape of the image portion or the change in shape of the physical body in real space corresponding to the image portion, in a predetermined period exceeds a predetermined level,
executes the first distance calculating process, when the change in shape exceeds the predetermined level, of calculating a distance between the physical body and the vehicle, by applying the size of the image portion of the physical body extracted from the captured image to a correlative relationship between a distance from the vehicle in real space set on assumption of the type of the physical body and a size of the image portion in the captured image, and
executes the second distance calculating process, when the change in shape is equal to or less than the predetermined level, of calculating the distance between the physical body and the vehicle, on the basis of the change in size of image portions of the physical body extracted from time-series captured images by the camera.

2. The vehicle surroundings monitoring device according to claim 1,
wherein the physical body is a pedestrian crossing a road, and
the distance calculating unit calculates, in the first distance calculating process, of calculating the distance between the physical body in real space corresponding to the image portion and the vehicle, by applying a height of the image portion extracted from the captured image to a correlative relationship between the distance from the vehicle in real space and the height of the image portion in the captured image, set such that a height of the pedestrian is a predetermined value.

3. A vehicle surroundings monitoring method, comprising:
capturing a captured image by a single camera mounted on a vehicle;
extracting an image portion from the captured image;
calculating a distance, using the a captured image, between the vehicle and a physical body in real space corresponding to the image portion; and
judging a type of the physical body in real space corresponding to the image portion;
wherein the step of calculating the distance includes:
determining a change in shape of the image portion or a change in shape of the physical body in real space corresponding to the image portion, in a predetermined period,
determining whether to execute a first distance calculating process or a second distance calculating process based on whether the change in shape of the image portion or the change in shape of the physical body in real space corresponding to the image portion, in a predetermined period exceeds a predetermined level,
executing the first distance calculating process, when the change in shape exceeds the predetermined level, of calculating a distance between the physical body and the vehicle, by applying the size of the image portion of the physical body extracted from the captured image to a correlative relationship between a distance from the vehicle in real space set on assumption of the type of the physical body and a size of the image portion in the captured image, and
executing the second distance calculating process, when the change in shape is equal to or less than the predetermined level, of calculating the distance between the physical body and the vehicle, on the basis of the change in size of image portions of the physical body extracted from time-series captured images by the camera.

4. The vehicle surroundings monitoring method according to claim 3,
wherein the physical body is a pedestrian crossing a road, and
the calculation of the distance between the physical body in real space corresponding to the image portion and the vehicle in the first distance calculating process includes applying a height of the image portion extracted from the captured image to a correlative relationship between the distance from the vehicle in real space and the height of the image portion in the captured image, set such that a height of the pedestrian is a predetermined value.

5. A vehicle surroundings monitoring system, comprising:
a single camera mounted on a vehicle; and
an electronic control unit including a processor and a non-transitory computer readable medium storing instructions to be executed by the processor, wherein the instructions include steps of:
  capturing a captured image by the single camera mounted on the vehicle;
  extracting an image portion from the captured image;
  calculating a distance, using the a captured image, between the vehicle and a physical body in real space corresponding to the image portion; and
  judging a type of the physical body in real space corresponding to the image portion;
wherein the step of calculating the distance includes:
  determining a change in shape of the image portion or a change in shape of the physical body in real space corresponding to the image portion, in a predetermined period,
  determining whether to execute a first distance calculating process or a second distance calculating process based on whether the change in shape of the image portion or the change in shape of the physical body in real space corresponding to the image portion, in a predetermined period exceeds a predetermined level,
  executing the first distance calculating process, when the change in shape exceeds the predetermined level, of calculating a distance between the physical body and the vehicle, by applying the size of the image portion of the physical body extracted from the captured image to a correlative relationship between a distance from the vehicle in real space set on assumption of the type of the physical body and a size of the image portion in the captured image, and
  executing the second distance calculating process, when the change in shape is equal to or less than the predetermined level, of calculating the distance between the physical body and the vehicle, on the basis of the change in size of image portions of the physical body extracted from time-series captured images by the camera.

6. The vehicle surroundings monitoring system according to claim 5,
wherein the physical body is a pedestrian crossing a road, and
the instructions for the calculation of the distance between the physical body in real space corresponding to the image portion and the vehicle in the first distance calculating process include applying a height of the image portion extracted from the captured image to a correlative relationship between the distance from the vehicle in real space and the height of the image portion in the captured image, set such that a height of the pedestrian is a predetermined value.

* * * * *